C. K. EDWARDS.
VEHICLE SPRING SUSPENSION.
APPLICATION FILED MAY 24, 1920.
1,349,332.
Patented Aug. 10, 1920.
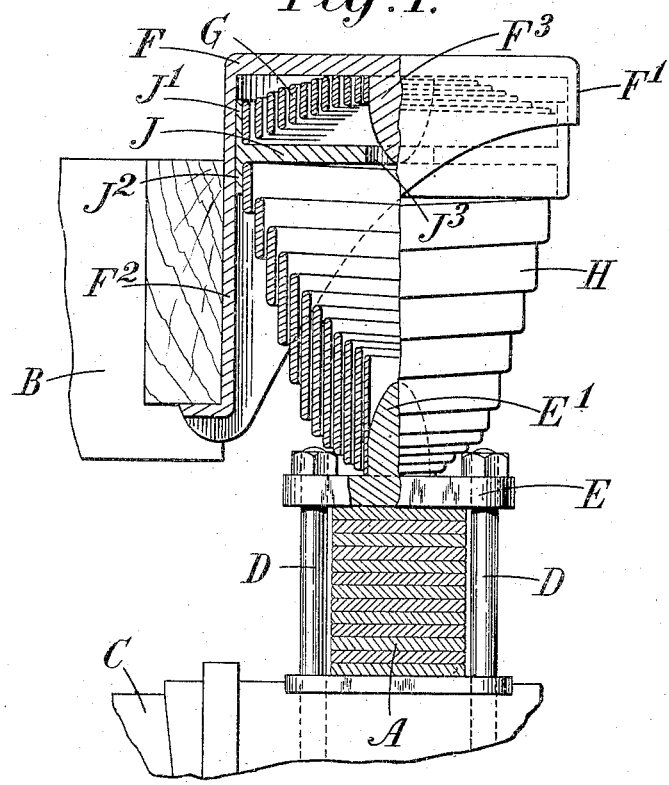
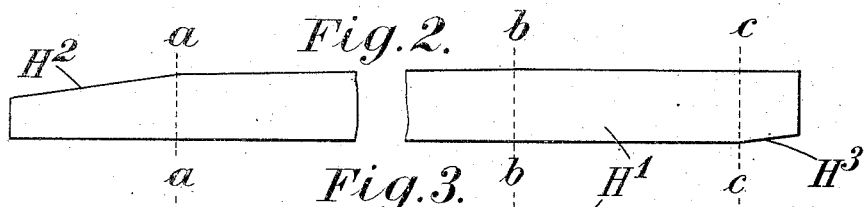
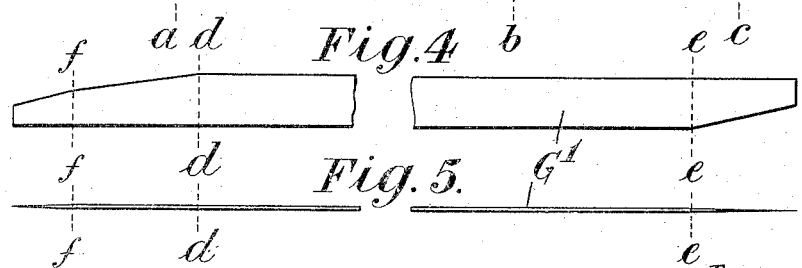
Inventor
Charles K. Edwards
by Wilkinson & Giusta.
Attorneys.

UNITED STATES PATENT OFFICE.

CHARLES KEARNS EDWARDS, OF CHINGFORD, LONDON, ENGLAND.

VEHICLE SPRING SUSPENSION.

1,349,332.   Specification of Letters Patent.   Patented Aug. 10, 1920.

Application filed May 24, 1920. Serial No. 383,921.

*To all whom it may concern:*

Be it known that I, CHARLES KEARNS EDWARDS, a subject of the King of England, residing at Chingford, London, E. 4, England, have invented certain new and useful Improvements in Vehicle Spring Suspensions, of which the following is a specification.

This invention relates to vehicle spring-suspensions of the type wherein one or more auxiliary springs are interposed between the vehicle body and the usual leaf spring carried by the road-wheel axle, which auxiliary springs are of various strength and are arranged to be brought into work in succession as the load increases.

The term "volute" spring employed hereinafter is intended to designate a spring of metal coiled in a helix and normally extended in the line of its major axis, in which direction its resiliency is utilized. Such a spring although not comprising cylindrical portions is of telescopic character inasmuch as when it is compressed, the one end is as it were telescoped into the other.

It has been previously proposed in a spring suspension for vehicles to employ two "volute" springs of unequal strength superposed between the axle-box and the body of the vehicle or between the vehicle body and the leaf spring carried by the wheel axle.

This invention has for its object to provide a compact arrangement of cumulative auxiliary springs which shall operate smoothly and reliably over a wider range of load than was possible with constructions of the type referred to known heretofore.

According to this invention, a vehicle spring-suspension wherein two auxiliary springs of spiral or "volute" character are superposed between the vehicle body and the usual leaf spring carried by the road-wheel axle one of such springs being stronger than the other is characterized by the stronger spring being of such strength relatively to the lighter spring, that it is virtually uncompressed until the load is such as to completely compress the said lighter spring.

Preferably, one or both of the auxiliary springs are made each from a tapered strip of spring steel, for the purpose of insuring that both coils will collapse approximately uniformly each throughout its entire range of action. It has before been proposed to form springs from tapered strips, but in the drawings a special taper is illustrated.

The invention consists in the construction, arrangement and combination of parts described hereinafter and pointed out in the claims.

One embodiment of the invention is illustrated by way of example, in the accompanying drawing, wherein:

Figure 1 is an elevation, partly in vertical section and partly broken away, showing one form of vehicle spring-suspension according to the invention;

Figs. 2 and 3 are detail views showing a strip for making one of the helical springs comprised in the spring-suspension, and Figs. 4 and 5 are detail views of a strip for making another of the helical springs.

Referring first to Fig. 1, a rear semi-elliptical vehicle spring A is hung at its ends in the customary manner by means of shackles from the chassis-frame B of a vehicle body. The middle portion or root of this main spring is clamped to the rear axle C in the usual manner by means of bolts D which engage at each side of the spring with an iron plate E resting on the top leaf of the spring.

A top iron plate F of circular form and having a depending rim $F^1$ to form an inverted cup is fixed by means of a lateral portion $F^2$ on the frame B of the vehicle vertically or approximately vertically above the plate E, and interposed between this cup F and the plate E are two superposed auxiliary volute springs G and H. These auxiliary springs are arranged co-axially one with the other and are separated at their adjacent ends by a circular iron plate or floating washer J having an upstanding rim $J^1$ and a depending rim $J^2$, so that two cups are formed; the base, that is to say the lower wider end, of the spring G rests in the upper of these cups, and the base, that is to say the upper, wider end, of the lower spring H, is held in the lower cup which is inverted. The upper end of the spring G is centered by a pin $F^3$ which extends downward from the middle of the plate F through a central hole $J^3$ in the plate J. The lower end of the lower volute spring H surrounds a boss $E^1$ formed centrally on the plate E on the main spring and owing to the pressure of the upper spring G always bears on this plate.

Of these two volute springs G and H, the upper, G, is a light spring, while the lower, H, is relatively heavy, their strengths being so proportioned that the heavy spring is not appreciably compressed until the light spring has been fully compressed. In the position of these springs as shown in the drawing the light spring G is partially compressed, while the heavy spring H is not appreciably compressed. Each of these springs is made from a strip of steel of such a shape that with a constant increase of load, each spring will be compressed approximately uniformly throughout its range of action.

The main volute spring H has twelve turns. As shown in plan and elevation in Figs. 2 and 3, this spring is made from a strip of spring steel H¹ which is narrow at one end and wider at the other, and tapers edgewise to a knife-edge at both ends. The rate of increase in width is not regular along the entire length of the strip, but considered in the direction from the narrow to the wider end, is considerable for about ⅛ of the length of the strip as far as the line $a$—$a$ and is then much less up to a line $b$—$b$ situated about ¾ of the way along the strip from the narrow end, at which point the strip has its maximum width and continues with parallel or nearly parallel edges until close to the other end at $c$—$c$. The narrower end portion constitutes the base of the coil, while the wider end portion is reduced somewhat in width near the actual extremity and forms the inside lower end of the volute spring. When the strip H¹ is coiled to form a helical spring in its operative position, its slanting edges H², H³ will bear against the plates J and E, respectively.

As shown in plan and elevation in Figs. 4 and 5, the strip G¹ of spring steel of which the light volute spring G is made has parallel edges for approximately ¾ of its length between the dotted lines $d$—$d$ and $e$—$e$, both of its ends being reduced in width by removing parts of opposite edges of the strip at the two ends which are also both tapered edgewise to form knife-edges at the extremities. The one end portion so far as the line $e$—$e$ extends approximately 1/12th of the length of the strip, while the other extends approximately ¼th of the length of the strip. In the former end portion the rate at which the strip decreases in width is constant, its edges being rectilinear, while in the latter end portion the rate of decrease is first less as far as the line $f$—$f$ and then greater nearer the extremity of the strip. This latter end portion constitutes the inner narrower end of the wound coil.

When the vehicle is in use and the main spring A is subjected to a bending strain, the two auxiliary volute springs G and H will come into play in succession. The lighter volute spring G will yield to the load first, and when this has been fully compressed the upper edge of the rim J¹ will butt against the underface of the plate F. The stronger volute spring H will then come into action and take up part of any additional load. The action of the three springs is thus cumulative, and it will be appreciated that the described arrangement provides a considerable range of elasticity for light loads, while springs of considerable strength are provided for taking up heavy loads.

The supports for the springs comprising the plate J and inverted cup F provide secure means for carrying the springs while allowing them free play.

What I claim as my invention and desire to secure by Letters Patent is:—

1. A vehicle spring-suspension comprising the combination with a main leaf-spring, of two auxiliary volute springs superposed thereon, one of which auxiliary springs is of such strength relatively to the other that it will remain virtually uncompressed until the load is such as to completely compress the lighter volute spring, and is made of a tapered strip of steel tapered edgewise to a knife-edge at both ends whereof one is narrower than the other, which strip increases in width for about three-quarters of its length from the narrower end, the degree of taper in width from the narrower end up to a point situated approximately one-eighth of the length of the strip away therefrom being greater than the degree of taper from said point to the point where the width is a maximum, substantially as and for the purpose set forth.

2. A vehicle spring-suspension comprising the combination with a main-leaf spring, of two auxiliary volute springs superposed thereon, one of which auxiliary springs is of such strength relatively to the other that it will remain virtually uncompressed until the load is such as to completely compress the lighter volute spring, the lighter of which auxiliary springs is made of a strip of steel having parallel edges for approximately three-quarters of its length between two end portions that are tapered in width and are also tapered edgewise to a knife-edge, one at each end of the strip, one of which end portions is about one-half length of the other and decreases constantly in width toward the adjacent end of the strip while the other of said end portions decreases in width first less, and then more, toward the adjacent end of the strip, substantially as and for the purpose set forth.

In testimony whereof I affix my signature.

CHARLES KEARNS EDWARDS.